United States Patent [19]

Miller et al.

[11] Patent Number: 4,685,127
[45] Date of Patent: Aug. 4, 1987

[54] SYSTEM FOR CONVERTING A NO. 5 CROSSBAR TELEPHONE SWITCHING CENTRAL OFFICE TO A CONFORMING EQUAL ACCESS CENTRAL OFFICE

[75] Inventors: Arthur O. Miller, Little Rock; Hollis Coleman, Forrest City, both of Ark.; Roger Atkinson, Huntsville, Ala.; Boyd Dorsey, Mabelvale, Ark.

[73] Assignee: Southwestern Bell Telephone, St. Louis, Mo.

[21] Appl. No.: 782,455

[22] Filed: Oct. 1, 1985

[51] Int. Cl.⁴ .......................... H04M 7/12; H04Q 3/48
[52] U.S. Cl. .................................... 379/221; 379/291; 379/210; 379/273
[58] Field of Search ............... 379/213, 221, 291, 210, 379/112, 115, 273, 275

[56] References Cited

U.S. PATENT DOCUMENTS 4,594,477 6/1986 Noirot .................................. 379/221

OTHER PUBLICATIONS

System Contact–Central Office Network Access, Northern Telecom Trade Brochure, 1984.
Toll Access Trunk–System (TATS) for Equal Access Applications, Science Dynamics Corporation Brochure, No Date.
E.A.A.S.–Equal Access Adapter System–Product Description TCI Tel-Control Inc. Trade Brochure, Jan. 1985.
No. 5 Crossbar System–General Descriptive Information Bell System, 6-1975.

Primary Examiner—James L. Dwyer
Attorney, Agent, or Firm—Neal Kalishman

[57] ABSTRACT

A method of providing equal access to a number of long distance carriers in local telephone company office containing No. 5 crossbar switching machines. Calls are intercepted between the line link frame and the originating registers. If the call is a long distance call, a serial number which resembles a conventional phone call is inserted in the calls place. The called number is stored and the appropriate carrier is determined by locating the calling party's pre-selected carrier choice in telephone company records. When the call identified by the serial number exits the switch it is automatically routed to the correct long distance carrier.

7 Claims, 6 Drawing Figures

SYSTEM FOR CONVERTING A NO. 5 CROSSBAR TELEPHONE SWITCHING CENTRAL OFFICE TO A CONFORMING EQUAL ACCESS CENTRAL OFFICE

BACKGROUND OF THE INVENTION

I. Field of the Invention

The invention relates to telephone central offices which utilize No. 5 crossbar switching equipment. In particular it relates to providing said switching equipment with the capability of routing long distance calls from telephone company customers to preselected long distance carriers. Those of ordinary skill in the art would be those who are familiar with the operation of the No. 5 crossbar switching system.

II. Description of the Prior Art

Most local telephone service in the United States of America is provided by a group of regional telephone companies that were formerly subsidiaries of A.T.&T. These telephone companies are required to provide "equal access" for their customers to long-distance carriers other than A.T.&T. Equal access requires that a customer be able to choose a primary long distance carrier and dial long distance calls directly rather than placing a call to the long distance carrier and using special codes in order to place the call. For example, the familiar 1+ dialing that is available with A.T.&T. would be available with another long distance carrier.

The burden has been placed upon the regional telephone companies to develop switching techniques to implement this "equal access" service. In the past all long distance calls were automatically sent through the A.T.&T. Bell System. Thus, central office equipment was originally designed to efficiently and quickly transfer all long distance calls into the A.T.&T. long distance trunk lines.

There are three basic types of switching equipment currently in use throughout the United States. These systems are step-by-step, No. 5 crossbar and electronic switching systems (ESS). The No. 5 crossbar system is an electromechanical system which is relatively prevalent in medium size central offices. There are several hundred of these systems nationwide which have a combined value in the millions of dollars. Unfortunately these systems are not suited for the providing of equal access long distance service.

In order for the regional telephone companies to effectively implement equal access, technical specifications were agreed upon by the telephone companies and the long distance carriers. These specifications are referred to as "feature group D switched access service". These specifications included the requirements that the switching equipment be capable of handling 16 to 20 digits, that the calling number be transmitted to the long distance carrier first and the called number second, and that additional indentifying digits be added to the normal stream of digits. Also, the switching equipment pursuant to these specifications must record the precise time that the long distance carrier's trunk is seized and the time it is released. These requirements can be met by the electronic switching equipment offices through changes in the software programs in these machines.

However, it has been found that electromechanical switching systems, especially No. 5 crossbar systems, cannot be brought into conformity with the "feature group D" specifications. For instance, the registers on a No. 5 crossbar switching system can accomodate no more than 11 digits. Also, the switching system is specifically designed to pass long distance calls through the system and to their destination before the equipment identifies the party that placed the call. Thus, it is believed by telephone company planners that it would be impossible to provide equal access to telephone calls passing through No. 5 crossbar switches to all long distance carriers.

Since the law mandates that regional telephone companies fully comply with all of the requirements of providing equal access, it appeared necessary to convert all No. 5 crossbar switching systems to ESS systems or to classify all of the customer lines coming into the office by which long distance carrier the customer has selected. The cost of replacing No. 5 crossbar switching systems is over $3 million per central office. The cost nationwide would be in the hundreds of millions of dollars. The incurring of such costs to replace equipment which is functioning well is not justified by projected consumer savings obtained through the equal access to all long distance carriers.

The second alternative of classifying customers by long distance carrier provides a no better result. A typical central office may have 18,000 customers. In order to classify customers, all 18,000 lines would have to be disconnected and reattached on the central office frames based on long distance carrier preference. Such a job would be very complex and very expensive. Also, even if all customers are classified by long distance carrier there would be no way to permit a customer to place a call via a carrier other than the single carrier to which he had originally elected.

The basic problem encountered in providing the No. 5 crossbar with equal access capabilities is that it was not designed to accomodate.more than one long distance carrier. It was specifically designed to facilitate traffic through the old Bell System. The underlying theory of the No. 5 crossbar is that a call is routed through the switch in the fastest time possible pursuant to a precision timing pattern. Each component of the switch must exactly synchronize with each other component. Any modification of a switch component affects the entire switching mechanism and thereby diminish the switches' effectiveness in switching both local and long distance calls. This loss of effectiveness is unacceptable.

It is an object of the present invention to provide a means of incorporating equal access capabilities into a central office equipped with a No. 5 crossbar switch. It is another object of the invention to provide said equal access without affecting the underlying principles of the No. 5 crossbar switch. A further object of the invention is to provide equal access to customers served by central offices having a No. 5 crossbar switch in a cost efficient manner which does not affect the quality of their telephone service. A final objective of the invention is to provide equal access to customers served by central offices containing No. 5 crossbar switches through a means which does not adversely affect the rest of the telephone system.

SUMMARY OF THE INVENTION

The present invention involves a method for providing local telephone company customers served by central offices equipped with No. 5 crossbar switching machines with equal access to long distance carriers without affecting the functioning of the No. 5 crossbar switching machine. The invention comprises the intercepting of a call while it is within the switching machine and determining the calling number and the called number. Transmitting this data to a device for determining the selected long distance carrier. The identifying of the long distance carrier is transmitted to the switch. The call is then routed to a converter which provides the long distance carrier with call identifying information. The call is next routed to the selected long distance carrier.

DESCRIPTION OF THE PREFERRED EMBODIMENT

A better understanding of the advancement in the state of the art taught by this disclosure can be had through a description of the basic operation of a No. 5 crossbar switching machine. The function of a No. 5 crossbar machine is the connection of a telephone call from a customer through the switching machine to another local customer or to an outgoing trunk to the long distance network. The call to the long distance network is the function that will be changed and modified by the present invention to equip the No. 5 crossbar switching machine for equal access (feature group D) operation. These functions are described in two sections. That is, the recognition that a customer has lifted his receiver, requested dial tone, is connected to an originating register and receives dial tone indicating the machine is in a condition ready to accept his dialed digits. This is called the dialing connection and is described as follows:

The originating registers are assigned to the trunk switches of the trunk link frames. A connection from the subscriber line to an originating register requires the selection and closure of a channel. A marker is required for the channel selection as well as register selection and calling line identification.

Figure 1:
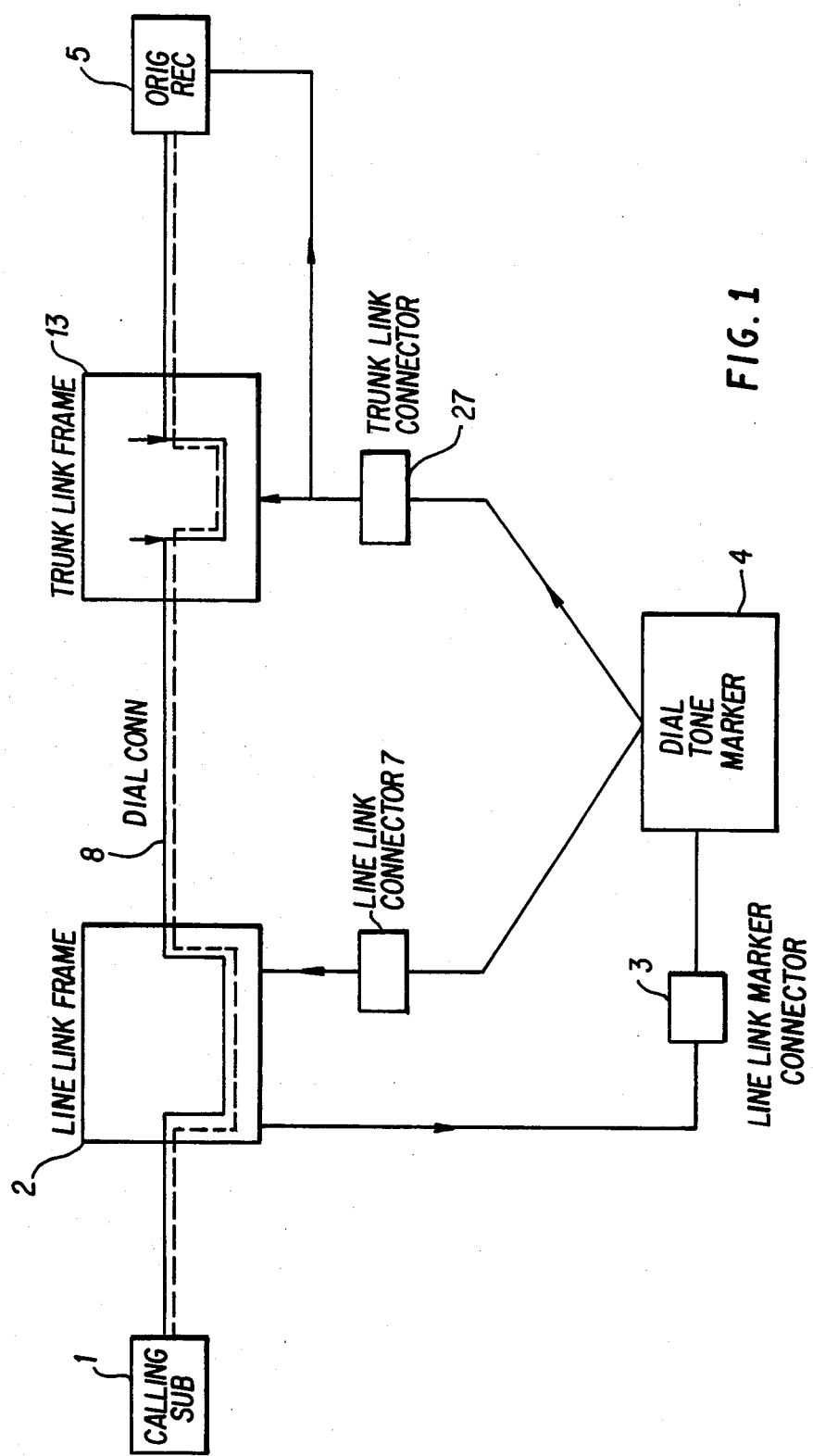
FIG. 1 is a block diagram of the components in a No. 5 crossbar switching office required to establish a dialing connection from a calling customer to the originating register.

See FIG. 1 for the block diagram showing the sequence of connection for the dial tone job. When a subscriber 1 removes the receiver from the switch hook, a line relay is operated which causes the line link frame 2 to inform the line link marker connector 3 that a dial tone marker 4 is required. The line link marker connector then selects an idle dial tone marker.

In order to establish a dialing connection between the subscriber's line 1 and an idle originating register 5, the marker must determine the equipment location of the calling line, select an idle register and then determine that a channel between the line and the register can be obtained.

The marker tests for the calling line location through the connection set up by the line link marker connector. While the marker is recording this information, it is also selecting an originating register 5. The originating registers are distributed as evenly as possible over all the trunk link frames 13. The selection of an idle originating register is a two-step operation. The first step consists of the marker selecting an idle trunk link frame that has an appearance of one or more idle originating registers. The second step is the selection of a particular register on the selected trunk link frame.

After the marker has selected the trunk link frame, the marker then returns to the line link frame 2 via the line link connector 7. Through this connection, the marker will be able to complete the subscriber line identification and also control the closing of the contacts on the crossbar switches, for the selected channel 8.

The marker 4 must select an idle channel 8 between the subscriber's line 1 and the selected originating register 5. When the marker 4 finds an idle channel, it operates the select and hold magnet required for channel closure. The marker 4 indicates to the originating register the identity of the line link used in the channel, the equipment location, and class of service of the calling line. The register stores this information for later use.

Before the marker 4 transfers control of the channel 8 to the originating register 5, it checks the connection for continuity, crosses or false grounds. The marker 4, upon satisfying itself that it has established a valid connection, releases its associated connectors and itself leaving the control of the channel with the originating register 5. The register furnishes dial tone to the subscriber and is now ready to receive the digit information from the subscriber's set.

This completes the dial tone connection. The digits which the subscriber dials or keys into the originating register are stored in the register for later marker use. As soon as dialing is completed, the register 5 will seize a completing marker and transmit to it all registered information. This information consists basically of (a) class of service of the calling subscriber, (b) line link location of the calling subscriber and party identification, and (c) dialed digits.

The preceding operation is followed regardless of the type of call being initiated. Since the originating register initiates action to obtain a completing marker at completion of dialing it must be able to determine how many digits are to be dialed for each call. While most calls will consist of seven digits: three for an office code identification and four numericals, the register may be required to complete calls on the basis of 3 to 11 digits.

In order to determine the number of digits to be received on each individual call, a pretranslation of the dialed information is performed. Pretranslation is the process of determining from the first 1, 2 or 3 dialed digits, how many the register should expect to receive on that particular call. When the number of calls that differ from the normal seven digits is small and the numbering plan is not too complex, pretranslation can take place in the originating register. For more complex numbering plans, or a large volume of calls using a variable number of digits, a separate pretranslator is provided. This circuit is called in by the originating register through the pretranslator connector after the first two or three digits have been set in the register. The pretranslator determines from these digits how many digits should be dialed and tells the register the number of digits that it should receive before calling in the completing marker.

Figure 2:
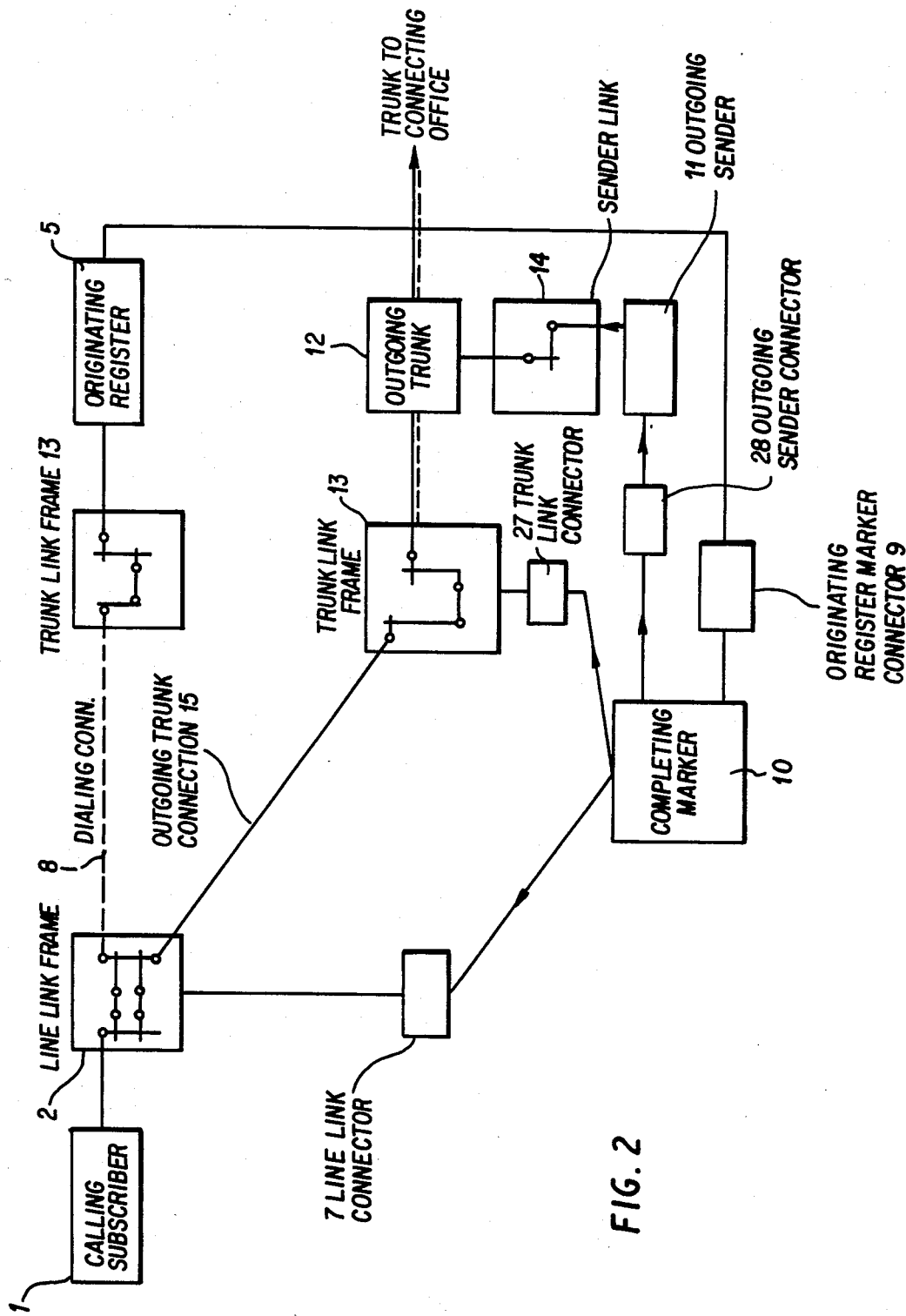
FIG. 2 is a block diagram of the components utilized by a No. 5 crossbar switching machine when a call has been changed from a dialing connection to an outgoing trunk connection.
Figure 3:
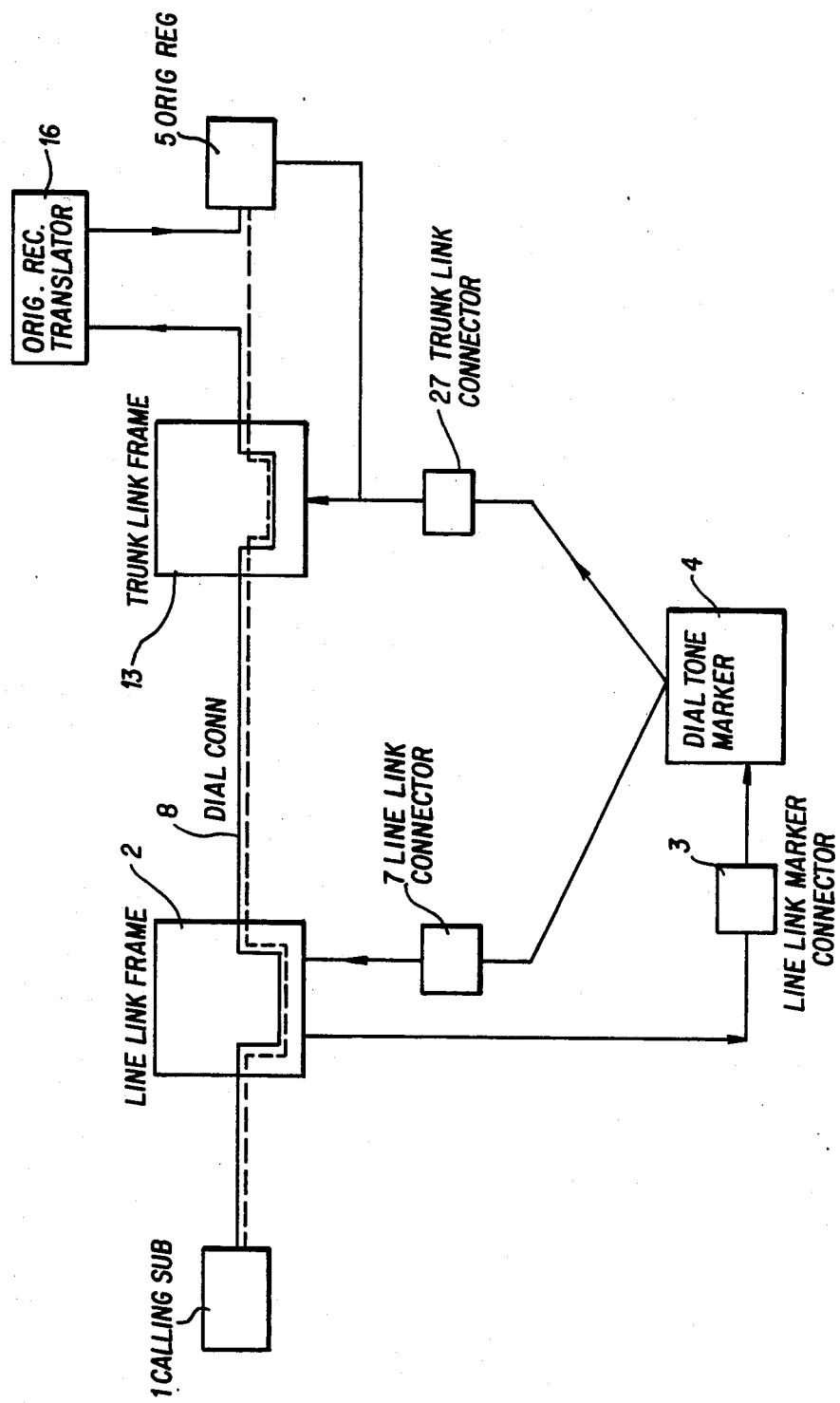
FIG. 3 is a block diagram of an established dialing connection showing the placement of the originating register translator.

When the dial tone connection has been established and the dialed digits are being dialed by the customer, the No. 5 crossbar machine begins to establish a path between the customer and an outgoing trunk to another office, an operator assistance switchboard, or to other facilities necessary to complete the call. This connection is referred to as an outgoing interoffice connection. A brief description of this connection follows:

outgoing calls are established to connecting offices or to operators for some type of service assistance. It is necessary to establish a connection from the subscriber's line to one of the outgoing trunks that terminate in the connecting office or operator's position. It may also be necessary to determine what, if any, charge is to be made and how to send the digits of the called number to the connecting office. FIG. 2 shows the sequence of connections for an outgoing call.

After the originating register 5 has recorded the proper number of digits, it signals its originating register marker connector 9 that a completing marker 10 is required. The originating register marker connector selects an idle completing marker 10 and establishes a connection from the originating register 5 to the marker. The originating register then transmits to the completing marker 10 all of the stored information; class of service, line link location, party identification, channel number and digit information.

The marker obtains routing instructions from a route relay which is operated by relating the called office code to the calling subscriber's class of service. This route relay will instruct the marker as to what type of pulsing to use and which group of outgoing trunks are going to the proper termination. The marker then proceeds to test for and select an idle outgoing sender 11 of the proper type. Once the marker has determined the availability of an outgoing sender, it then proceeds to test the office for location of idle outgoing trunks 12 and idle trunk link frames 13 serving those idle outgoing trunks. The marker then selects through trunk link connector 27 a particular outgoing trunk 12 and trunk link frame 13 to service this call using the same technique as in the selection of an idle originating register. It then through outgoing sender connector 28 causes the sender link frame 14 to set up a connection between the outgoing trunk 12 and the outgoing sender 11. While this connection is being completed, the marker 10 seizes the line link connector 7 associated with the subscriber's line link frame 2. Information as to the equipment location of the calling subscriber was obtained from the originating register 5. The marker 10 now tests for and selects an idle channel 15 from the calling subscriber to the outgoing trunk 12. When the marker finds an idle channel 15, it operates a select and hold magnet required to close through the channel; testing the channel for validity. The marker 10 then tests for continuity before transferring control to the outgoing sender 11.

While the marker 10 was setting these latter connections, it was instructing the outgoing sender 11 on how to handle this particular call. It informed the outgoing sender of the digits dialed, which digits if any are to be deleted, what digits, if any, to prefix, and the type of test or supervisory signals required by the connecting trunks. The marker then releases its associated connectors and itself, leaving the outgoing sender 11 in charge of the call. The outgoing sender will test and outpulse to the terminating office in accordance with the class instructions it received from the marker.

The descriptions of the dial tone connection for the customer and the outgoing call connection to distant offices shows the basic operation of a common control type telephone switching machine. The markers are used to control various components and establish connections requiring long holding times by the customer. When these connections are established, the markers and other sommon equipment are released from that particular call and are available in sequence to serve other calls.

Prior suggestions for modifying No. 5 crossbar switching equipment to process equal access calls have been discarded because they required changing the operation, timing, and control of the various functions. In addition, prior suggestions have been made to add additional relays in various components to enable the machine to process the additional digits required by equal access. These suggestions have not been considered feasible because of the changes in real time required for the operation and release of these additional relays. The entire No. 5 crossbar machine operation is based on the precise seizure and release of various components. Therefore, any suggestion to modify the operation of the machine is considered not viable since it would effect the underlying operation of the machine.

Figure 4:
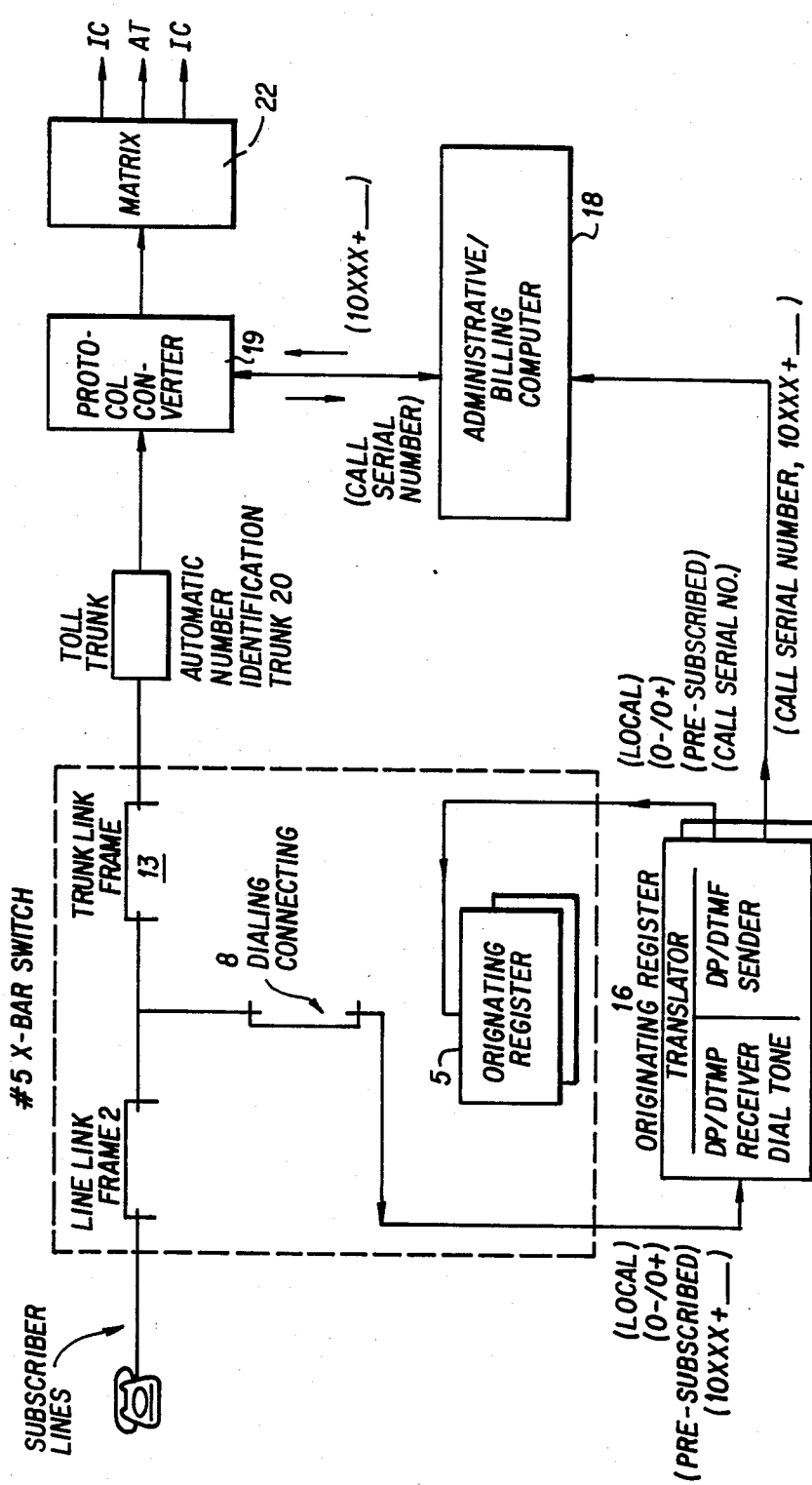
FIG. 4 is a block diagram showing the path of the call and the various components involved in changing the digits used on the call to conform to feature group D operation.

A common point within the No. 5 crossbar switching system is the originating register 5. Since this register as designed cannot store more than 11 digits, means must be provided to increase the digit and storage handling capacity of an originating register 5 to process up to 16 to 20 digits in order to implement equal access service. In order to process this increased digit flow, translator 16 is placed in series with the tip and ring of each register 5 and in parallel with the ON1 and MST 1 relay coils in the register. The operation of the originating register translator 16 is described in detail later in this disclosure. This unique device and the placement of the device in a location in the No. 5 crossbar switching machine that will permit continuous access to any and all calls being processed by the No. 5 crossbar machine, permits the No. 5 crossbar machine to recognize feature group D type calls by customers, separate those calls requiring the machine to handle additional digits, and at the same time permit the machine to proceed with call carrying functions in the normal manner. Referring to FIG. 4 for the placement of the originating register translator 16 in the path of calls being processed by the machine is shown.

The translator 16 differentiates between the various types of calls, processes certain of these calls in the normal manner, recognizes long distance calls, that is, calls beginning with a 1+ 7/10 digits, calls beginning with 0+ 7/10 digits and direct these calls to the proper destination. It also recognizes calls beginning with a 00, 01, 011 and 10XXX (calls from customers who have presubscribed to a specific interexchange carrier but who desire to place calls over the facilities of another carrier). These calls may require up to 16 to 20 digits. The originating register translator 16 passes through to the originating register 5 unchanged all calls in the normal manner except the aforementioned 00, 01, 011 and 10XXX type calls. The 00, 01, 011 and 10XXX+ 7/10 digit calls are captured and stored by the translator since the originating register 5 does not have sufficient capacity to accept more than 11 digits. Further, the digits 00 presented to the originating register create translation problems.

The originating register translator 16 operates by looking at the digits dialed by the subscriber and repeats them to the originating register 5. When an 0 or 1+ code is detected, the next digit is intercepted and examined. If that second digit is a 0 (zero) or 1 (one), the translator does not repeat customer dialed digits to the originating register 5. This is because of the probability that more digits are coming than the originating register 5 can handle.

The originating register translator 16 collects the remaining dialed digits and passes them over data links to a redundant pair of administrative billing computers common to this office 18. In addition, it adds a seven digit number unique to this call to the digit stream and passes this number to the billing computer 18 as a serial number to identify this specific call. The specifics of this action are described later.

At the same time, the translator passes the arbitrary seven digit serial number into the originating register 5 as if it were the remainder of the called number. In order to satisfy the originating register and central office pretranslator, the serial number begins with digits chosen to appear to be a legitimate seven digit number. By satisfying the register, the No. 5 crossbar machine is tricked into processing the call just as it would had no change been made in the number of digits dialed. This reduces holding and processing time on the call.

The feature of the components superimposed on the No. 5 crossbar switching machine by this invention which permits the use of an arbitrary seven digit number to satisfy the switching machine and to permit it to process the call as if the customer had actually dialed the digits, and the capacity to use these arbitrary digits as a serial number to later identify a specific call and associate that call with the corresponding original customer dialed digits is unique and is an important feature of the modification of a No. 5 crossbar machine to enable the machine to process equal access feature group D calls. In addition, the insertion of the originating register translator 16 into the dialing path ahead of the originating register 5 which permits capturing, examining, storing and forwarding the customer dialed digits is also unique to this invention.

Again referring to FIG. 4, it is necessary to change the position of the calling number and the called number in the digit stream sent to the interexchange carriers. It is also desirable to reduce the interval of time from the completion of dialing by the customer to the time that the digits for the call are outpulsed to the interexchange carrier. This interval is commonly referred to as post dialing delay. Means to accomplish these objectives are provided by a protocol converter 19.

All calls preceded by a 1+ 7/10 digits and a 0+ 7/10 digits are passed through the originating register as dialed by the customer because the originating register can accept and process the 11 digits. Since this invention makes no changes in the operation of the original No. 5 crossbar components, these long distance calls will proceed normally through the No. 5 crossbar machine. Changes in the dialing path beyond the trunk will be described later. All such calls in addition to being passed through the normal No. 5 crossbar dialing path will be passed into the protocol converter 19 which is any commercially available computer that is capable of doing simple number manipulation and subsequently to an administrative billing computer 18. The protocol converter 19 has access to the list of customers who have prescribed to specific carriers. These are contained in look-up tables to enable identification of the interexchange carrier to which the calling customer has previously subscribed.

When the originating register translator 16 recognizes a call preceded by 00, 01, 011 or 10XXX, it dials the arbitrary seven digit serial number into the originating register 5 as previously described. The completing marker 10 connects the subscriber line to the protocol converter 19 via an ANI trunk (Automatic Number Identification Trunk) 20 and causes the sender 11 to outpulse into the protocol converter the remaining seven digits stored in the originating register 5. These are the arbitrary digits used as a serial number for this call. After the above functions are complete, the protocol converter 19 requests and receives ANI information for the calling telephone number. While receiving the ANI digits, the protocol converter 19 sends the serial number assigned to this particular call to one of the pair of redundant common billing processors 18. The billing processor uses the serial number to return the actual digits dialed by the customer to the protocol converter 19. These were the digits captured and stored by the originating register translator 16 and sent to the protocol converter 19. At this point, call processing proceeds as if all digits had been received through the switch. The above disclosed invention enables a No. 5 crossbar switching system to accept and process streams of digits required for equal access (feature group D) service and for future requirements such as international direct distance dialing, using prefixes such as 01 and 011 which require even greater numbers of digits.

Figure 5:
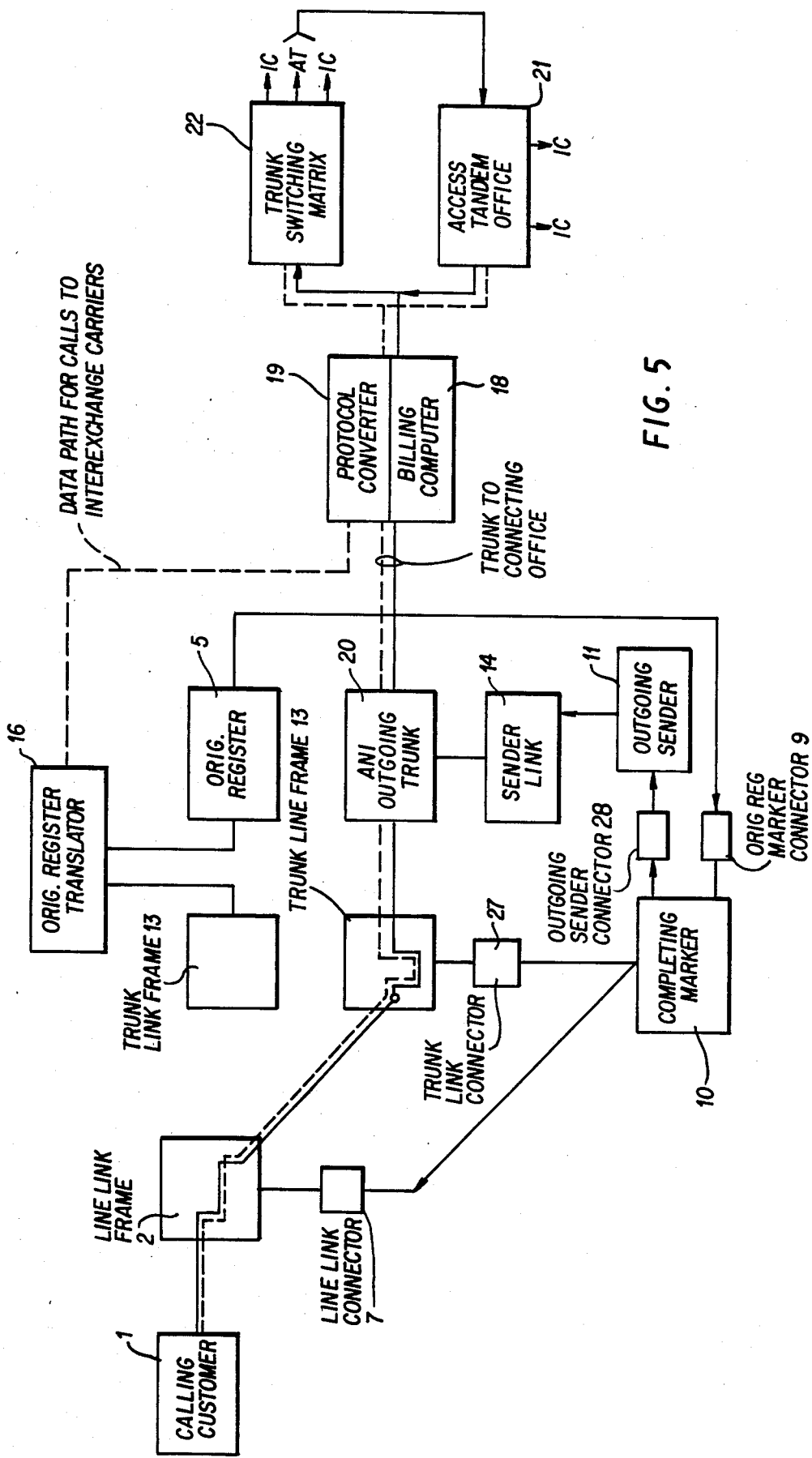
FIG. 5 is an overall block diagram showing the establishment of a call connected through a No. 5 crossbar central office utilizing the method of the invention.

FIG. 5, shows the points of insertion of the protocol converter 19 into the transmission and signaling path of each outgoing trunk so that the protocol converter looks to the trunk as if the trunk were connected to a toll switching center. When the digits to be sent forward to the interexchange carrier become available in the protocol converter 19, it arranges them in the proper order for the interexchange carrier and requests the identity of the calling number from the end office trunk exactly as the present day toll switching centers do. By analysis of the dialed digits and reference to the aforementioned tables of presubscription information for each subscriber's directory number that reside in either the administrative billing computer 18 or the protocol converter 19, the protocol converter is programmed to select the proper carrier and put the feature group D message into the format required by the carrier. If the No. 5 crossbar local switching office that is processing the call is connected to a tandem switching machine 21, the protocol converter inserts the tandem routing digits and carrier identification code (ZZZ+XXX) into the message which will enable the tandem switching office 21 to route the call to the selected carrier.

In order to direct calls from any customer in the exchange to a direct trunk group for any of the interexchange carriers, means are provided to connect the output from the protocol converter 19 to the proper direct trunk to the proper carrier. This is accomplished by the use of a trunk switching matrix 22. While the matrix switching arrangement could be accomplished using solid state logic techniques, the preferred embodiment, for economic reasons, is a simple crossbar switch having the direct trunks to the various carriers connected to the horizontals of the crossbar switch. Means are provided by the protocol converter 19 to close relays in the switching matrix in the proper order to operate the vertical and hold magnets of the crossbar switch to connect the output of the ANI trunk used on the call being processed to the proper direct trunk to the proper carrier.

As examples of the method of the invention, the processing of two types of equal access calls are described. The first call described will be to an interexchange carrier to which the customer has previously subscribed. This means that he will indicate a long distance call by using the prefix 1 plus the area code N 0/1 X to be dialed plus the prefix (NXX) of the telephone wire center at the called location plus the four digits (XXXX) of the telephone number to be called. When the customer lifts the receiver on his telephone, the circuit is closed through the central office switching equipment and the dialing path is set up to the originating register as previously described. The originating register performs the normal functions of testing for party identification, coin identification, etc. At this time dial tone is supplied to the customer.

Figure 6:
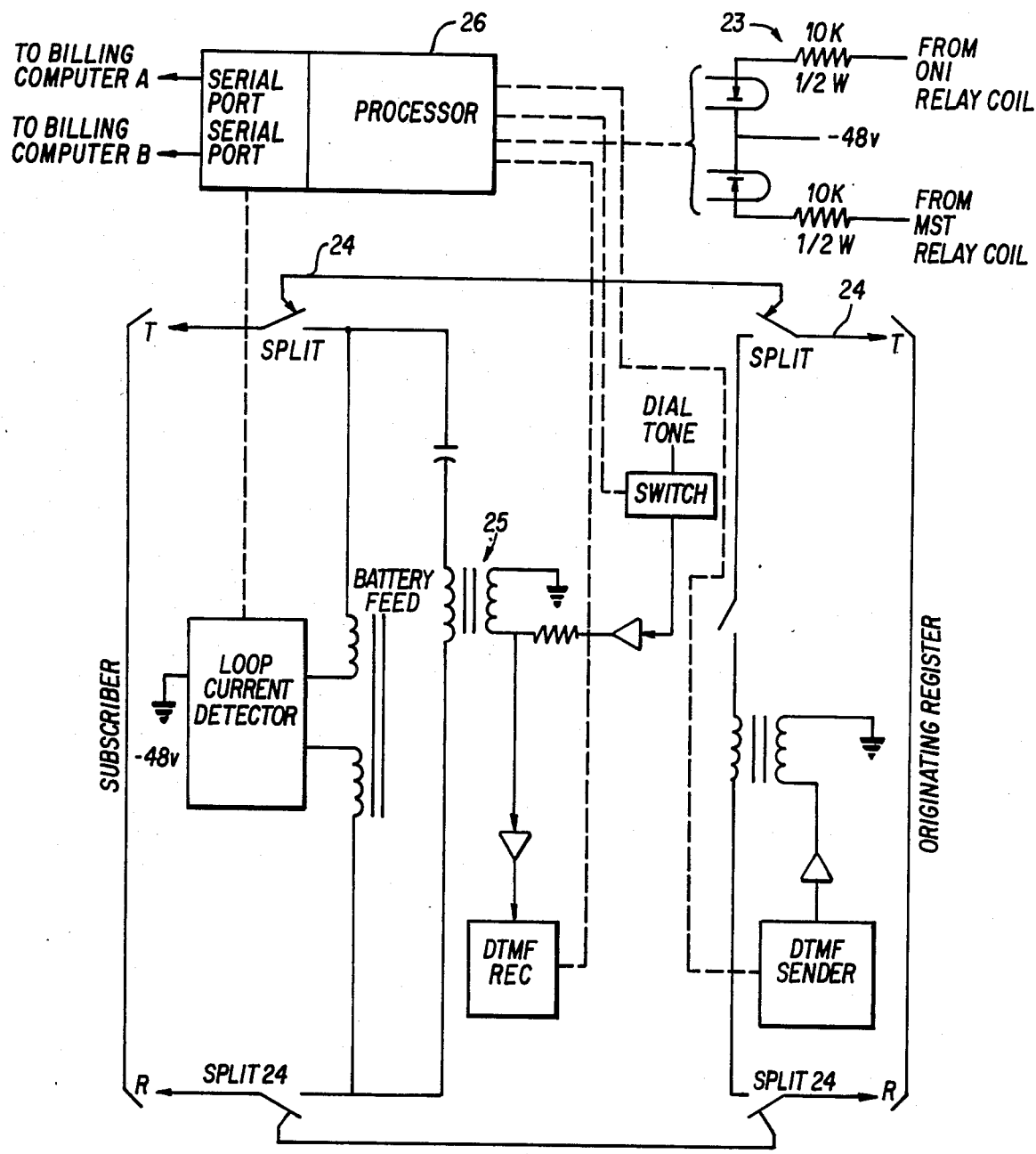
FIG. 6 is a block diagram schematic of a preferred originating register translator.

When the originating register prepares to transmit dial tone to the customer and the circuit is closed through the calling customer's switch hook, it also operates the ON1 and the MST1 relays in the originating register. The disclosed translator, FIG. 6, has circuitry provided in parallel with these relay coils 23 which operates a switching relay to open the tip and ring path to the customer and to the originating register 24. This is the splitting relay which metallically inserts the originating register translator in series with the dialing path between the customer and the originating register. Should the power or translator processor 26 fail, a feature of this invention is that if the power or the processor fails the split relay will not operate, therefore, passing all calls to the register. The only calls that will be lost will be the 10XXX and other special calls. Since the No. 5 crossbar originating register originally supplied the dial tone to the customer, the dial tone will now be supplied through the translator by way of an audio transformer circuit 25. When the originating register translator is inserted into the dialing path, the digit storage and input/output capability of the translator processor 26 is available to intercept digits as they are dialed, inspect these digits and store and forward them to the proper destination at the proper sequence in the call.

As the customer begins to dial, the digits are intercepted by the originating register translator and accepted. Note that in most areas of North America, a 1 (one) is required to begin a long distance call. In some areas, however, a 1 (one) has not been used to begin a long distance call; the switching machine analyzes the first six digits to determine if the call is long distance. Presubscribed calls, therefore, do not always require a leading 1 (one), but feature group D non presubscribed calls must begin with 10XXX. If the first digit is a 1 (one), a look-up table in the translator recognizes that this call will be a long distance call which may require translations. If the second digit is anything other than a 0 (zero), the translator knows this will be a normal long distance call which will contain the usual 7 or 10 digits which the originating register is capable of handling. In areas not requiring a leading 1 (one) for a long distance call only the special 10XXX calls are examined. Following the inspection of the second digit and not finding a 0 (zero), the originating register translator repeats the digits to the originating register just as if they were dialed directly by the customer. When the originating register receives the last digit of this call, it seizes a completing marker and the call is established in the normal manner. This call is established to an ANI trunk. The protocol converter 19 is inserted into the signaling path between the ANI trunk and the transmission facility from the switching office to the toll tandem switcher or to the interexchange carrier. When the ANI trunk has been satisfied that it has a proper connection, the protocol converter will send the trunk a wink start signal. The No. 5 crossbar sender then outpulses all of the previously dialed digits. In the interim period the No. 5 crossbar maching has utilized the ANI equipment to identify the telephone number of the calling customer. The sender transmits the digits dialed and the number of the calling customer to the protocol converter. The protocol converter 19 refers to a look-up table to determine to which carrier the calling customer has presubscribed. This information is stored as a three (3) digit (XXX) carrier identification code. The protocol converter 19 assembles the carrier identification code, calling number and called number as required in the proper order and transmits the entire stream of digits to the selected carrier.

The interexchange carriers have requested that the Bell Operating Companies send the calling telephone number first in the stream of digits for feature group D operation. Since all electromechanical Bell System switching machines were designed to transmit the called telephone number first in the order, feature group D service requires a reversal of that order. A unique feature of the disclosed invention is in the reversal of the order of transmitting the calling and called telephone numbers.

Another unique feature is the insertion of the routing digits (ZZZ) and the carrier identification code (XXX) in the proper position in the digit stream by the protocol converter. If the call is to be routed to an access tandem office, the protocol converter will pass the stream of digits to the access tandem office which will utilize the (ZZZ and XXX) codes to terminate the call into an outgoing trunk to the proper carrier. In the event the telephone switching office utilized by the customers has direct trunks to one or more interexchange carriers or operator service switchboards, means must be provided at the switching office to direct the call to the trunk for the proper carrier. This has been accomplished by switching matrix 22 which will accomplish that purpose as previously described. If a call is routed through the trunk switching matrix 22 to the access tandem 21 the routing code (ZZZ) and the carrier identification code (XXX) will still be sent forward. If the call is routed to a direct trunk group, the carrier identification code will be used for such routing but neither (ZZZ) or (XXX) will be sent. This completes the description of a call to a carrier to which the customer has previously subscribed.

As a second example, the following describes the routing of a feature group D call through a No. 5 crossbar switching office to a carrier other than the carrier to which the customer had previously subscribed. These calls are referred to in the industry as 10XXX calls. When the customer begins to place his call and lifts his receiver, the dialing connection is established as previously described. At the time dial tone is to be furnished to the customer, the originating register translator examines the first digit received. If that digit is a 1 (one) or a 0 (zero), the second digit is intercepted and examined by the translator. If the second digit is a 0 (zero), the translator sends no more digits to the register at this time because the information contained in the first two digits tells the translator that either more digits are coming than the register can handle or that the customer dialed code is special and cannot be routed properly by the switch without utilization of the translator processor 26. If the first two digits are a 0 (zero), the translator utilizes this information to determine the number of potential additional digits to be received, in this example none. This flexibility is required in order to accommodate future international direct distance dialing and other dialing patterns such as 10XXX #. The DTMF # indicates end of dialing and is not accepted by most crossbar switches. The translator collects any remaining digits and passes them over data links to the administrative billing computer 18 common to this office. At this juncture in the call, the originating register translator assigns an arbitrary seven digit number that is unique to this call and passes this number to the billing computer as a serial number to identify this specific call along with the customer dialed digits. The billing computer 18 files these messages by serial number for later retrieval by whichever protocol converter receives the call from the switch. At the same time, the translator dials the arbitrary seven digit serial number into the originating register as if it were the customer dialed number. In order to satisfy the originating register and central office pretranslator, the serial number begins with digits chosen to appear to be a legitimate seven digit number. If in an area not using a leading one (1) for presubscription, the one (1) is not sent; only the seven digit serial number is sent. The arbitrary seven digits cannot be completely inserted into the originating register until the customer has dialed his last digit. This is to keep the register from calling for a marker prematurely. A form of overlapped outpulsing can be used at this point in order to save machine holding time and also reduce post dialing delay. This will also extend the permanent signal timing to prevent register time out on slow dialing customers. If the call is a seven or ten digit call, the translator will outpulse to the originating register the first three digits of the serial number when the first three, if seven digits, or the first six, if ten digits, of the actual called number are received. We now have four more digits to be received from the customer and four more arbitrary digits to be put back into the register. These will be handled on a one for one basis, i.e., as the customer dials the fourth from the last digit, the translator puts the fourth from the last arbitrary digit into the originating register. Then the third from the last is handled in the same manner and so is the second from the last. This stops dialing delay for all but the last digit. When the last digit has been dialed by the customer, the translator recognizes it as the last digit and dials the last arbitrary digit into the register. This starts the register toward the marker as if the actual dialed digits had been put in the originating register by the customer. By satisfying the register, the No. 5 crossbar machine is tricked into processing the call just as it would had no change been made in the number of digits dialed. This reduces holding and processing time on the call.

As noted earlier it is necessary to change the position of the calling number and called number in a digit stream sent to the carrier. We also stated that we wanted to reduce post dialing delay to a minimum. After the translator has changed the 10XXX type calls and dialed the arbitrary seven digit serial number into the originating register as described above, the No. 5 crossbar switch connects the subscriber line to the protocol converter via an ANI trunk and outpulses into the protocol converter the remaining seven digits stored in the originating register. This is the arbitrary message serial number. The protocol converter 19 requests from the billing computer 18 the actual dialed digits filed with this particular serial number. When the protocol converter has received the required digits and arranged them in the proper feature group D format, as if the digits had been received through the switch as in an ordinary presubscription call, it has the option of transmitting them to an access tandem central office as previously described or to the proper interexchange carrier direct trunk.

In order to provide all variations of feature group D service, the originating register translator will be equipped to examine up to six (6) digits. This is referred to as six digit translation in the industry. This feature will permit intralata billing of customers calls that terminate in another numbering plan area when this type billing is appropriate. It also permits handling and processing the variety of service code calls that are unique to particular local telephone company centers.

Continuing to refer to FIG. 5, previous descriptions of the disclosed invention have made reference to a pair of administrative billing computers 18 which are associated with the protocol converter 19. A feature unique to this invention is disclosed wherein the administrative billing computer 18 which can be located in a remote location for servicing a number of central offices, is designed to add an additional data level to the billing process. In the original No. 5 crossbar switching machine, the automatic message accounting equipment was designed to identify and record the called number, the calling number, and the precise time that the called number answered and the time of the disconnect of the call. This worked well when one company served all long distance customers in the nation. With the breakup of the Bell System, there are now many interexchange carriers providing long distance service. The local telephone company is required to identify and record the previously mentioned data and in addition, it must identify and record the proper carrier and the precise time that the interexchange carrier trunk returns the wink signal back to the telephone company trunk signifying that the interexchange carrier trunk has been seized and is in a condition to accept digits. In addition, the precise disconnect time for this trunk must be recorded. Means are provided in combination with the originating register translator 16, the protocol converter 19, and the administrative billing computer 18 to record the additional data.

The administrative billing computer 18 associated with the protocol converter 19 has provided means for the local telephone company to administer these data bases from a remote location. This is accomplished by having an inputoutput port on the administrative billing computer 18 available to the remote location in the local telephone company. The preferred embodiment would be to enable the recent change memory administration center personnel to access the administrative billing computers 19 directly and on an as needed basis when customers subscribe to the various carriers or change carriers. Another feature is a second port available to the administrative billing computer 19 making data from the protocol converter 18, individual originating register translator 16 and the administrative billing computer 19 available to maintenance testers in the local telephone company switching control centers. This will enhance maintenance operations and reduce the cost of having personnel travel to the distant office in order to make maintenance changes and adjustments or to take failed components out of service to where customers will not access defective equipment.

The present invention automatically insures the selection of the correct carrier for long distance calls. More importantly, the No. 5 crossbar functions in its normal manner without unacceptable delays in call processing. Thus, the customer is provided equal access to a number of long distance carriers without any effect on the quality of telephone service. In fact, this procedure adds no more than 3 seconds to the processing of a telephone call through a No. 5 crossbar switch.

We claim:

1. A method for providing equal access to long distance telephone carriers to local telephone company customers who are served by central offices having No. 5 crossbar switching machines without affecting the functioning of said No. 5 crossbar switching machine comprising:

a. intercepting the call while it is within the switching machine and determining the calling number and the called number;
   b. transmitting said data to a device for determining the selected long distance carrier;
   c. transmitting the identity of the selected long distance carrier to the switch;
   d. routing said call to a converter which provides the long distance carrier with call identifying information; and
   e. routing said call to the selected long distance carrier.

2. The method of claim 1 wherein said call is intercepted between the line link frame and the originating register.

3. The method of claim 2 wherein said call is intercepted by an originating register translator.

4. The method of claim 1 wherein said long distance carrier is determined through the use of a computer.

5. The method of claim 3 wherein said call is passed through said switch as a code and the called number is stored outside the switch.

6. The method of claim 1 which further comprises determining the time at which the long distance carrier line is seized and released with respect to the call.

7. The method of claim 1 wherein all of the requirements for feature D equal access are met by a No. 5 crossbar switch central office.

* * * * *